United States Patent
Huang et al.

(10) Patent No.: US 10,514,737 B2
(45) Date of Patent: Dec. 24, 2019

(54) MONITORING CIRCUIT FOR POWERED DEVICE SUPPLIED WITH POWER OVER ETHERNET

(71) Applicant: Wistron Corporation, New Taipei (TW)

(72) Inventors: Shih-Chuan Huang, New Taipei (TW); I-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/141,926

(22) Filed: Sep. 25, 2018

(65) Prior Publication Data

US 2019/0250683 A1 Aug. 15, 2019

(30) Foreign Application Priority Data

Feb. 12, 2018 (TW) .............................. 107104947 A

(51) Int. Cl.
| | |
|---|---|
| *G06F 1/26* | (2006.01) |
| *H04L 12/10* | (2006.01) |
| *G06F 1/28* | (2006.01) |
| *H02J 1/00* | (2006.01) |

(52) U.S. Cl.
CPC ............... *G06F 1/263* (2013.01); *G06F 1/28* (2013.01); *H02J 1/00* (2013.01); *H04L 12/10* (2013.01)

(58) Field of Classification Search
CPC ........ G01R 27/00; G01R 27/08; G01R 31/04; G06F 1/00; G06F 1/26; G06F 1/28; G06F 1/30; G06F 1/263; G06F 1/266; H02J 1/00; H02J 3/02; H02J 3/38; H02J 9/04; H04B 3/30; H04B 3/54; H04L 12/10; H04L 12/24; H04L 12/26; H04L 25/02
USPC ....... 324/538, 691, 713; 340/310.01, 310.03, 340/568.2; 375/257; 713/300, 310, 320, 713/323, 340
See application file for complete search history.

(56) References Cited

U.S. PATENT DOCUMENTS

| | | | | |
|---|---|---|---|---|
| 2008/0150718 | A1* | 6/2008 | Apfel | ...................... H04L 12/10 340/568.2 |
| 2013/0015722 | A1* | 1/2013 | Lu | ........................... G06F 1/266 307/130 |

FOREIGN PATENT DOCUMENTS

CN 102074998 A 5/2011

* cited by examiner

Primary Examiner — Shawkat M Ali
(74) Attorney, Agent, or Firm — Winston Hsu

(57) ABSTRACT

A powered device powered by power over Ethernet, PoE, and DC power supply comprises a DC supply circuit, for providing a power required by the powered device, to the powered device via a DC adapter, a PoE circuit, for providing the power to the powered device via a power source equipment, PSE, and a monitoring circuit, connecting with the DC supply circuit and the PoE circuit, for outputting the power to the powered device from the DC supply circuit or the PoE circuit with at least one of a plurality of metal-oxide-semiconductor field-effect transistors, MOSFETs, and bipolar junction transistors, BJTs.

12 Claims, 3 Drawing Sheets

MONITORING CIRCUIT FOR POWERED DEVICE SUPPLIED WITH POWER OVER ETHERNET

BACKGROUND OF THE INVENTION

1. Field of the Invention

The present invention relates to a powered device supplied with Power over Ethernet, PoE, and DC power supply, and more particularly, to a powered device that is switched between PoE and DC power supply with a monitoring circuit.

2. Description of the Prior Art

Power over Ethernet, PoE, refers to provide DC power for terminal devices such as Voice over IP phone, VoIP phone, network access points, network cameras, etc. while transmitting data signals to these terminal devices, under the existing Ethernet cabling infrastructure. The IEEE 802.3af standard is a new standard for Ethernet power supply systems, which is based on IEEE 802.3 standard of direct power supply by the cable line. In addition, it is an extension of the existing Ethernet standard as well as power distribution of international standards.

According to the IEEE 802.3af standard, a full Ethernet power supply system includes a Power Sourcing Equipment, PSE, and a Powered Device, PD. The PSE is used for providing power to the PD, and the PD obtains the power through a network port, for example RJ45.

The applicant notices that the power supplied to the VoIP phone is limited by the outputted power (e.g. 15.4 W) of the PSE, which is the maximum power that can be provided by each level of the PSE specified by the IEEE 802.3af standard. Therefore, the user may not be able to connect other expansion devices to the VoIP phone due to the power limitation of the PoE, which results in that the VoIP phone is required of other power sources (e.g. a DC power supply) for power supply, so as to link more expansion devices. However, current VoIP phone under two power sources, namely network port and DC power port, may encounter that the system does not know what kind of power supply exists, and how the system chooses one as the power source, which causes a problem of power switching between the two power sources.

Conventional solution is to use two diodes as the isolation of the two power sources, or a microcontroller, MCU, to switch between the two power sources. In detail, the usage of two diodes as a power switch has the advantage of being inexpensive and preventing reverse bias. However, the disadvantage is that the diode itself has a voltage loss caused by forward voltage. That is, when the current is getting bigger, the forward voltage is higher accordingly, which affects voltage of the back end as a result of the current level change, and causes low efficiency. On the other hand, if the MCU is used as the power switch, the advantage is that the required power source can be accurately switched, but the disadvantages is that the peripheral line of the MCU needs to be increased and the price is higher. Besides, someone needs to be responsible for writing and modifying the software for MCU application.

SUMMARY OF THE INVENTION

It is therefore an object of the present invention to provide a powered device that is switched between PoE and DC power supply with a monitoring circuit, to solve abovementioned problems.

The present invention discloses a powered device supplied by both of power over Ethernet, PoE, and DC power supply. The powered device comprises a DC supply circuit, for providing a power required by the powered device, to the powered device via a DC adapter, a PoE circuit, for providing the power to the powered device via a power source equipment, PSE, and a monitoring circuit, connecting with the DC supply circuit and the PoE circuit, for switching power supply between the DC supply circuit and the PoE circuit to output the power to the powered device, wherein the monitoring circuit includes at least one of a plurality of metal-oxide-semiconductor field-effect transistors, MOSFETs, and bipolar junction transistors, BJTs.

The present invention discloses a powered device supplied by both of power over Ethernet, PoE, and DC power. The powered device comprises a DC supply circuit, for providing a power required by the powered device, to the powered device via a DC adapter, a PoE circuit, for providing the power to the powered device via a power source equipment, PSE, and a monitoring circuit, connecting with the DC supply circuit and the PoE circuit, wherein the monitoring circuit includes a comparator and a load switch, the comparator is used for generating a switch signal according to output voltages from the DC supply circuit and the PoE circuit, and the load switch is used for determining whether outputting the power of the PoE circuit according to the switch signal.

The present invention discloses a monitoring circuit used in a powered device for switching power supply between a DC power supply and a power over Ethernet, PoE, wherein the powered device comprises a DC supply circuit and a PoE circuit. The monitoring circuit comprises an output terminal, for outputting a power from the DC supply circuit or the PoE circuit, a first metal-oxide-semiconductor field-effect transistor, MOSFET, where the drain of the first MOSFET is connected with the DC supply circuit and the source of the first MOSFET is connected with the output terminal, a second MOSFET, where the gate of the second MOSFET is connected with the DC supply circuit, the source of the second MOSFET is connected with ground, and the drain of the second MOSFET is connected with the gate of the first MOSFET, and a third MOSFET, wherein the gate of the third MOSFET is connected with the DC supply circuit, the drain of the third MOSFET is connected with the PoE circuit, and the source of the third MOSFET is connected with the output terminal.

The present invention discloses a monitoring circuit used in a powered device for switching power supply between a DC power supply and a power over Ethernet, PoE, wherein the powered device comprises a DC supply circuit and a PoE circuit. The monitoring circuit comprises a first bipolar junction transistor, BJT, where the emitter of the first BJT is connected with the DC supply circuit, the collector of the first BJT is connected with an output terminal of the monitoring circuit, a second BJT, where the base of the second BJT is connected with the DC supply circuit, the emitter of the second BJT is connected with ground, and the collector of the second BJT is connected with the base of the first BJT, and a third BJT, where the base of the third BJT is connected with DC supply circuit, the emitter of the third BJT is connected with PoE circuit, and the collector of the third BJT is connected with the output terminal.

The present invention discloses a monitoring circuit used in a powered device for switching power supply between a DC power supply and a power over Ethernet, PoE, wherein the powered device comprises a DC supply circuit and a PoE circuit. The monitoring circuit comprises a comparator, for generating a switch signal according to output voltages from the DC supply circuit and the PoE circuit, and a load switch, for determining whether outputting the power of the PoE circuit according to the switch signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
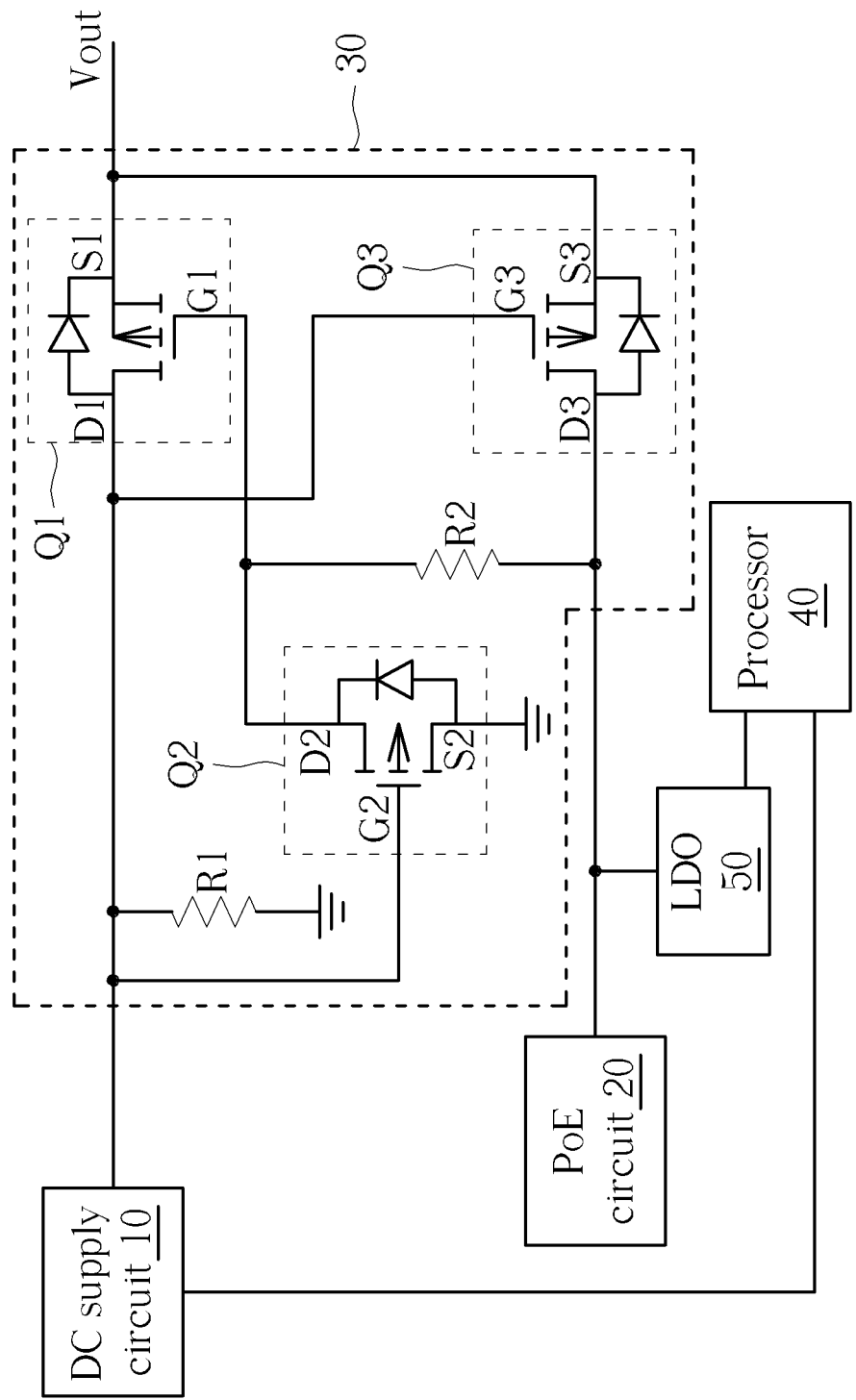
FIGS. 1-3 are schematic diagrams of powered device according to the present disclosure.

Reference is made to FIG. 1, which is a schematic diagram of a powered device according to the present disclosure. The powered device may be a Voice over IP phone, VoIP phone, a network access point, a network camera, etc. The powered device includes a DC supply circuit 10, a PoE circuit 20, a monitoring circuit 30, a processor 40, and a Low Dropout (LDO) 50. The DC supply circuit 10 provides the required system power to the powered device via a DC adapter. The PoE circuit 20 provides the required system power to the powered device via a Power Source Equipment, PSE. The monitoring circuit 30 is connected with the DC supply circuit 10 and the PoE circuit 20, and is used for switching power supply between the DC supply circuit 10 and the PoE circuit 20 for the powered device. The processor 40 is used for determining which power supply (e.g. the DC supply circuit 10 or the PoE circuit 20) is currently applied to the powered device. In detail, the DC supply circuit 10 includes a DC Jack, which has a detecting pin designed for plugging into the DC adapter to form a short circuit or high voltage, such that the processor 40 is informed that the DC supply circuit 10 is outputting voltage. In this embodiment, DC supply circuit 10 outputs 5V DC voltage upon connecting the DC adapter. The PoE circuit 20 includes a network port such as RJ45 for connecting the PSE. In addition, the PoE circuit 20 is connected with the LDO 50, for decreasing the voltage inputted to the processor 40 when the output voltage provided by the PoE circuit 20 is higher than the load voltage of the processor 40.

Note that, unlike conventional diodes or MCU for power supply switching, the monitoring circuit 30 of the present invention is realized by Metal-Oxide-Semiconductor Field-Effect Transistor, MOSFET, such as P-channel MOSFET, for power supply switching. In detail, monitoring circuit 30 is capable of selecting the DC supply circuit 10 or the PoE circuit 20 to output the system power to the powered device. The monitoring circuit 30 includes the first MOSFET Q1, the second MOSFET Q2, the third MOSFET Q3, and the output terminal Vout. The drain D1 of the first MOSFET Q1 is connected with the DC supply circuit 10, the gate G1 of the first MOSFET Q1 is connected with the drain D2 of the second MOSFET Q2, and the source S1 of the first MOSFET Q1 is connected with the output terminal Vout. The gate G2 of the second MOSFET Q2 is connected with the DC supply circuit 10, the source S2 of the second MOSFET Q2 is connected with ground. The gate G3 of the third MOSFET Q3 is connected with the DC supply circuit 10, the drain D3 of the third MOSFET Q3 is connected with the PoE circuit 20, and the source S3 of the third MOSFET Q3 is connected with the output terminal Vout.

Detailed power supply operation of monitoring circuit 30 with MOSFET is as follows. When the PSE is connected to the PoE circuit 20 via the RJ45, the current flows from the PoE circuit 20 to the drain D3 of the third MOSFET Q3, and then flows from the drain D3 to the sources D3, to output system power to the powered device. Since the impedance of the P-channel MOSFET is small, the voltage drop is slight, so that the power supply performance is better than the conventional diodes. On the other hand, when the PSE is connected to the PoE circuit 20 via the RJ45, and the DC adapter is connected to the DC supply circuit 10 via the DC power port, the DC supply circuit 10 outputs voltage to the gate G2 of the second MOSFET Q2, and thus the current path from the drain D2 to the source S2 is conducted. As a result of the gate G1 of the first MOSFET Q1 becomes close to zero voltage, the first MOSFET Q1 is in conducting state, and thus the voltage provided by the DC supply circuit 10 is outputted to the powered device by the source S1 of the MOSFET Q1. With such manner, the voltage of the DC supply circuit 10 is much closed to the voltage of the PoE circuit 20, and thus the gate G3 of the third MOSFET Q3 is equipotential to the drain S3, which causes the third MOSFET Q3 is in non-conducting state. Thus, the current only flows through the internal diode of the third MOSFET Q3, which causes high voltage loss and in a state of almost no power supply, and therefore the voltage provided by the PoE circuit 20 will not be outputted by the third MOSFET Q3.

As can be seen, with the monitoring circuit 30, DC adapter has higher precedence over the PSE for power supply. In a word, the DC supply circuit 10 can provide efficient power to the powered device when the user plugs the DC adapter. Thus, the power supply limitation of the PSE (i.e. the maximum power of each level defined in the IEEE 802.3af specification) is solved. In addition, the present invention can achieve the purpose of accurately switching the power sources through a simple circuit without adding the expensive MCU.

Figure 2:
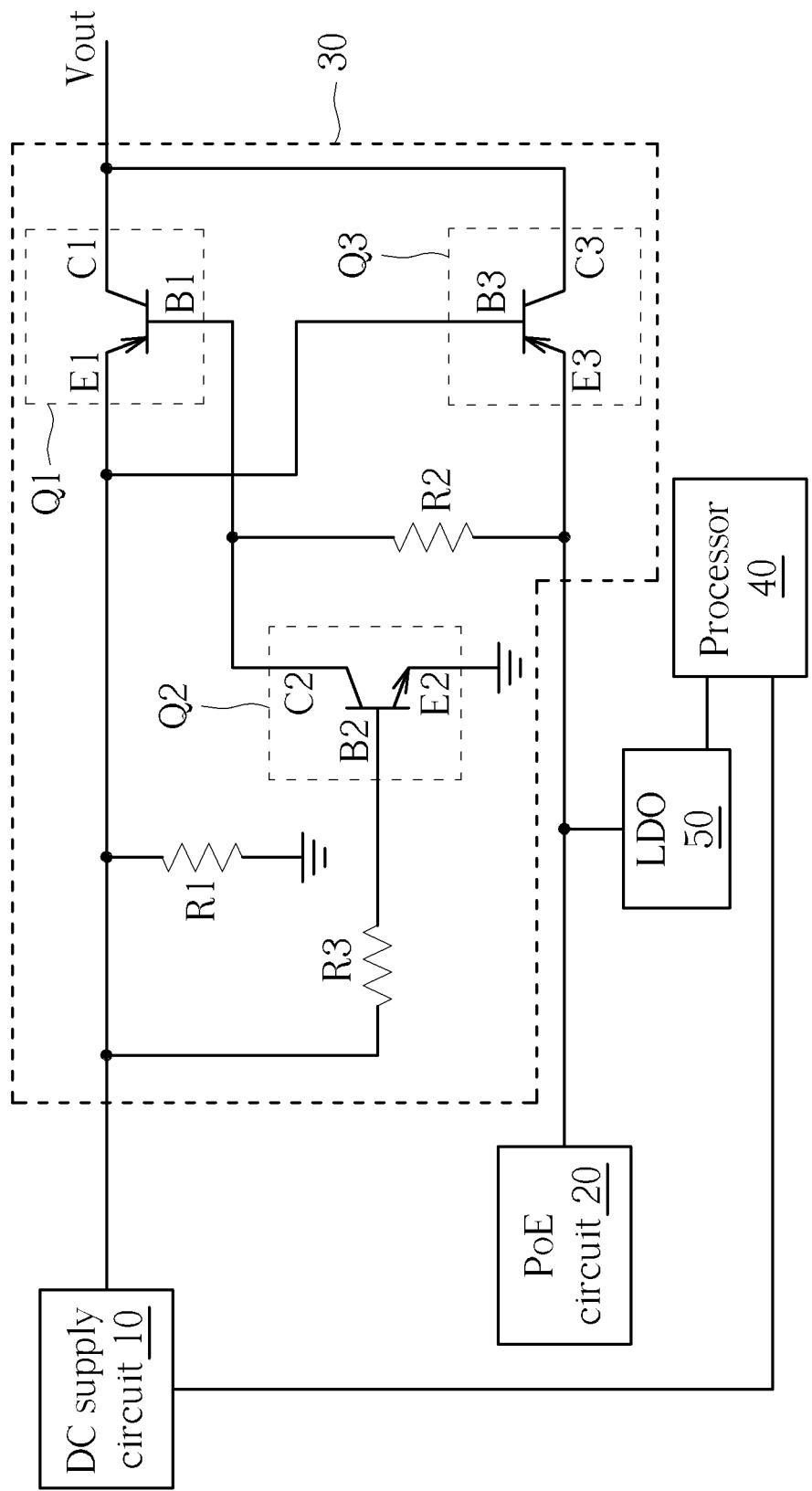

Reference is made to FIG. 2, which is a schematic diagram of a powered device according to the present disclosure. Compared to the example of MOSFET of monitoring circuit 30 in FIG. 1, the power supply switching operation of the monitoring circuit 30 of FIG. 2 is realized by bipolar junction transistor, BJT. That is, the monitoring circuit 30 includes the first BJT Q1, the second BJT Q2 and the third BJT Q3. The emitter E1 of the first BJT Q1 is connected with the DC supply circuit 10, the base B1 of the first BJT Q1 is connected with the collector C2 of the second BJT Q2 and the collector C1 of the first BJT Q1 is connected with the output terminal Vout. The base B2 of the second BJT Q2 is connected with the DC supply circuit 10, the emitter E2 of the second BJT Q2 is connected with ground, the base B3 of the third BJT Q3 is connected with DC supply circuit 10, the emitter E3 of the third BJT Q3 is connected with PoE circuit 20, and the collector C3 of the third BJT Q3 is connected with the output terminal Vout.

Detailed power supply operation of monitoring circuit 30 with BJT is as follows. When the PSE is connected to the PoE circuit 20 via the RJ45, the current flows from the PoE circuit 20 to the emitter E3 of the third BJT Q3, and therefore the system power is outputted by the collector C3 of the third BJT Q3 due to the base B3 of BJT Q3 is in low voltage. On the other hand, when the PSE is connected to the PoE circuit 20 via the RJ45, and the DC adapter is connected to the DC supply circuit 10 via the DC power port, the DC supply circuit 10 outputs voltage to the base B2 of the second BJT Q2, and thus the current path from the collector C2 to the emitter E2 is conducted. The first BJT Q1 is in conducting state as a result of the base B1 of the first BJT Q1 becomes close to zero voltage, and thus the voltage provided by the DC supply circuit 10 is considered as the power source and outputted by the collector C1 of the BJT Q1. In addition, the voltage of the DC supply circuit 10 is much closed to the voltage of the PoE circuit 20, and thus the base B3 of the third BJT Q3 is equipotential to the emitter C3, which causes the third BJT Q3 is in non-conducting state. Thus, the voltage provided by the PoE circuit 20 will not be outputted by the third BJT Q3, so as to realize that the DC adapter has higher precedence over the PSE for power supply.

Figure 3:
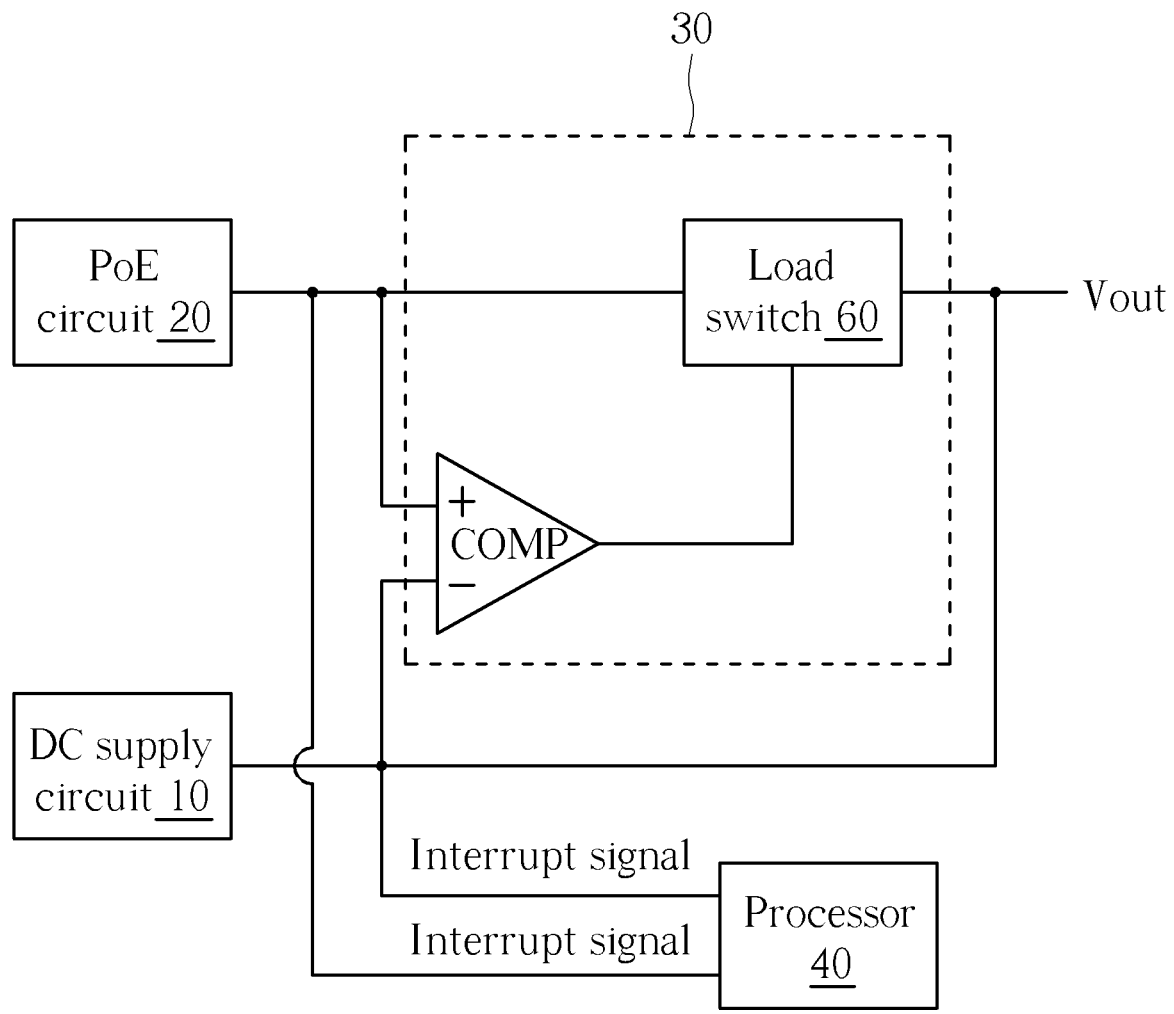

Moreover, the power supply switching operation of the monitoring circuit 30 can be realized by a comparator and a load switch. Reference is made to FIG. 3, which is a schematic diagram of a powered device according to the present disclosure. The comparator COMP is connected with DC supply circuit 10 and PoE circuit 20, and is used for generating a switch signal to the load switch 60. The load switch 60 determines whether outputting the power of the PoE circuit 20 according to the switch signal. The comparator COMP outputs "1" in case only PoE circuit 20 outputs voltage while the load switch 60 is conducted to output the power of the PoE circuit 20. On the other hand, the comparator COMP outputs "0" in case the DC supply circuit 10 and the PoE circuit 20 both output voltages while the load switch 60 is not conducted, such that the power provided by the PoE circuit 20 cannot be outputted, but the power provided by the DC supply circuit 10 can be outputted. Besides, as abovementioned, when the DC supply circuit 10 and the PoE circuit 20 are connected with the DC adapter and PSE, the DC supply circuit 10 and the PoE circuit 20 respectively generate an interrupt signal (i.e. with a detecting pin of the connecting port) for informing the processor 40 of the power supply condition.

In conclusion, the present invention proposes the monitoring circuit for power supply switching, which is realized by MOSFETs, BJTs or comparator, to increase power supply efficiency. In addition, the present invention utilizes detecting pins of the network port and DC power port to inform the processor of current power supply source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A powered device supplied by both of power over Ethernet, PoE, and direct current, DC, power supply, the powered device comprising:
   a DC supply circuit, for providing a power required by the powered device, to the powered device via a DC adapter;
   a PoE circuit, for providing the power to the powered device via a power source equipment, PSE; and
   a monitoring circuit, connecting with the DC supply circuit and the PoE circuit, for switching power supply between the DC supply circuit and the PoE circuit to output the power to the powered device, wherein the monitoring circuit comprises a first, second and third metal oxide semiconductor field effect transistors, MOSFETs, a drain of the first MOSFET is coupled with the DC supply circuit, a gate of the first MOSFET is connected with a drain of the second MOSFET, a source of the first MOSFET is connected with an output terminal of the monitoring circuit, a gate of the second MOSFET is coupled with the DC supply circuit, a source of the second MOSFET is connected with a ground, and a gate of the third MOSFET is coupled with the DC supply circuit, a drain of the third MOSFET is connected with the PoE circuit, and a source of the third MOSFET is connected with the output terminal.

2. The powered device of claim 1, further comprising a processor for determining a current power supply is from the DC supply circuit or the PoE circuit.

3. The powered device of claim 2, wherein the DC supply circuit or the PoE circuit includes a detecting pin for generating an interrupt signal to the processor when the detecting pin detects short or high voltage, whereby the processor determines whether the DC supply circuit or the PoE circuit provides the power to the powered device according to the interrupt signal.

4. The powered device of claim 2, further comprising a Low Dropout, LDO, connecting with the PoE circuit, for decreasing an output voltage from the PoE circuit, to provide a proper operating voltage to the processor.

5. The powered device of claim 1, wherein the DC supply circuit includes a DC power port and the PoE circuit includes a network port.

6. A monitoring circuit utilized in a powered device for switching power supply between a direct current, DC, power supply and a power over Ethernet, PoE, the powered device comprising a DC supply circuit and a PoE circuit, the monitoring circuit comprising:
   an output terminal, for outputting a power from the DC supply circuit or the PoE circuit;
   a first metal-oxide-semiconductor field-effect transistor, MOSFET, wherein a drain of the first MOSFET is coupled with the DC supply circuit and a source of the first MOSFET is connected with the output terminal;
   a second MOSFET, wherein a gate of the second MOSFET is coupled with the DC supply circuit, a source of the second MOSFET is connected with a ground, and a drain of the second MOSFET is connected with a gate of the first MOSFET; and
   a third MOSFET, wherein a gate of the third MOSFET is coupled with the DC supply circuit, a drain of the third MOSFET is connected with the PoE circuit, and a source of the third MOSFET is connected with the output terminal.

7. A monitoring circuit utilized in a powered device for switching power supply between a direct current, DC, power supply and a power over Ethernet, PoE, the powered device comprising a DC supply circuit and a PoE circuit, the monitoring circuit comprising:
   a first bipolar junction transistor, BJT, wherein an emitter of the first BJT is coupled with the DC supply circuit, a collector of the first BJT is connected with an output terminal of the monitoring circuit;
   a second BJT, wherein a base of the second BJT is coupled with the DC supply circuit, an emitter of the second BJT is connected with a ground, and a collector of the second BJT is connected with a base of the first BJT; and
   a third BJT, wherein a base of the third BJT is coupled with the DC supply circuit, an emitter of the third BJT is connected with the PoE circuit, and a collector of the third BJT is connected with the output terminal.

8. A powered device supplied by both of power over Ethernet, PoE, and direct current, DC, power supply, the powered device comprising:

a DC supply circuit, for providing a power required by the powered device, to the powered device via a DC adapter;

a PoE circuit, for providing the power to the powered device via a power source equipment, PSE; and a monitoring circuit, connecting with the DC supply circuit and the PoE circuit, for switching power supply between the DC supply circuit and the PoE circuit to output the power to the powered device, wherein the monitoring circuit comprises a first, second and third bipolar junction transistors, BJTs, an emitter of the first BJT is coupled with the DC supply circuit, a base of the first BJT is connected with a of the second BJT, a collector of the first BJT is connected with an output terminal of the monitoring circuit, a base of the second BJT is coupled with the DC supply circuit, a emitter of the second BJT is connected with a ground, a base of the third BJT is coupled with the DC supply circuit, an emitter of the third BJT is connected with the PoE circuit, and a collector of the third BJT is connected with the output terminal.

9. The powered device of claim 8, further comprising a processor for determining a current power supply is from the DC supply circuit or the PoE circuit.

10. The powered device of claim 9, wherein the DC supply circuit or the PoE circuit includes a detecting pin for generating an interrupt signal to the processor when the detecting pin detects short or high voltage, whereby the processor determines whether the DC supply circuit or the PoE circuit provides the power to the powered device according to the interrupt signal.

11. The powered device of claim 9, further comprising a Low Dropout, LDO, connecting with the PoE circuit, for decreasing an output voltage from the PoE circuit, to provide a proper operating voltage to the processor.

12. The powered device of claim 8, wherein the DC supply circuit includes a DC power port and the PoE circuit includes a network port.

\* \* \* \* \*